United States Patent [19]

Prignitz et al.

[11] Patent Number: 5,270,347
[45] Date of Patent: Dec. 14, 1993

[54] PROCESS FOR THE MANUFACTURE OF POLYURETHANE FOAMED PLASTICS

[76] Inventors: Herbert Prignitz, Pergamentweg 7, D-2000 Hamburg 74; Najdat Redha, Gründgensstrasse 16, D-2000 Hamburg 60, both of Fed. Rep. of Germany

[21] Appl. No.: 972,463
[22] PCT Filed: Jul. 10, 1991
[86] PCT No.: PCT/EP91/01282
  § 371 Date: Jan. 19, 1993
  § 102(e) Date: Jan. 19, 1993
[87] PCT Pub. No.: WO92/01736
  PCT Pub. Date: Feb. 6, 1992

[30] Foreign Application Priority Data

Jul. 19, 1990 [DE] Fed. Rep. of Germany ..... 90113848

[51] Int. Cl.$^5$ ................................. C08J 9/10
[52] U.S. Cl. ...................... 521/125; 521/128
[58] Field of Search ................... 521/125, 128

[56] References Cited

U.S. PATENT DOCUMENTS 2,250,192 7/1941 Cuthbertson .................. 260/722

FOREIGN PATENT DOCUMENTS

767719A1 9/1967 Canada ........................ 400/5
1009505 5/1952 France ......................... 14/8

*Primary Examiner*—Morton Foelak
*Attorney, Agent, or Firm*—Feiereisen & Kueffner

[57] ABSTRACT

The invention relates to a process for the manufacture of polyurethane foamed plastics which are formed by adding the polyurethane reactants to a solution of salts which decompose upon the exothermic polymerization reaction of said reactants to give off nitrogen gas which in turn foams the resultant polyurethane plastic.

3 Claims, No Drawings

PROCESS FOR THE MANUFACTURE OF POLYURETHANE FOAMED PLASTICS

FIELD OF USE

The present invention can be employed in the sector of foamed plastics manufacture and relates to a process for the manufacture of polyurethane foamed plastics, in which the foaming process is carried out with pure nitrogen being used as blowing agent.

PRIOR ART

Foamed plastics that possess a closed cellular structure or a porous cellular structure are obtained either by means of a pressure-less foam production or by a sudden expansion of gases, by blowing agents or solvents which, at more elevated pressures, cause an expansion pressure within the plastic or liquid plastic mass. In this case the foam structure is produced due to chemical reactions as, e.g. in the case of polyurethane, by the addition of expanding agents which decompose at a certain temperature during the processing white forming such gases as $N_2$ or $CO_2$; the addition of volatile solvents during the polymerization being also known. The foaming process itself takes place either when exiting from the extrusion die, i.e. following the extrusion or injection molding, or in the open mold. In this case, foam stabilizers prevent the foam from collapsing prior to the final curing. Poreforming blowing agents (expanding agents), such as azo compounds and diazo compounds spat off, inter alia, $N_2$ when being acted upon by heat or catalysts.

Among the foamed plastics, the polyurethane foamed plastics (PUR) possess the greatest technical importance, these are obtained by a gradual polyaddition of diisocyanates to dioles when water and/or carbonylic acids are present, for these react with the isocyanates white forming carbon dioxide which possesses an expanding and foam-forming effect. As isocyanates, mainly low-molecular diisocyanates, and as dioles, polyester and polyether-polyoles are suitable. Additionally required processing aids in this polyaddition are catalysts, emulsifiers, foam stabilizers and suchlike.

It is known that, in the manufacture of PUR foamed plastics, fluorohydrocarbons are employed as principal blowing agents. Apart from these, the $CO_2$ also possesses an expanding effect, this being formed by the reaction of the added water with the existing cyanate. A fluorohydrocarbon-free foamed plastic in which $CO_2$ were to be employed as the sole expanding agent, would be subject to the following disadvantages:

1) The diffusion of the $CO_2$ from the foam cells into the environment takes less time than the reversed diffusion of the air into the cells. Due to this, a low pressure with respect to the atmosphere is produced in the cells which, during the final curing time of the cellular plastic, causes a collapsing of the foam body. This instability would have to be compensated by a substantially increased volumetric weight of the foamed plastic.
2) The reaction of the cyanate with water is exothermic. On account of the additionally developed heat, cracks and core discolorations are produced, e.g. in foam stabs.

The employment of ammonium nitrite as expanding agent in the manufacture of hollow bodies, such as spheres and the like is known according to DE-Literature H. Rompp "Chemie-Lexikon", 5th edition, keyword: "Ammoniumnitrit", Page 232. The FR-A-1.009.505 describes a process for the manufacture of cellular substances which consists in that, as means for the foaming of the mass to be treated, a mixture of components is employed which, in each case, comprises an inert carrier material wherein an active substance has been finely distributed which is suitable for the manufacture of the cellular substances for reacting with the active substance or substances. As inert carrier materials, all natural, higher organic polymers, all synthetic higher polymers, all solvents, expanding agents, softening agents and plasticizers of the higher polymers quoted, as well as mixtures of the same can be employed. As an active substance with the reaction of a gas release, any substance may be used which reacts with at least one other substance in such a way that at least one of the reaction products is a gas, in which case the substance itself may release gas. The active substance for the release of gas is comprised of any ammonium compound whatever, in particular of an ammonium salt, any organic or inorganic acid whatever, including the ammonium complex salts and the ammonium double salts. Also inorganic or organic nitrites may be employed for a reaction for the release of a gas. With this process it is intended to obviate the disadvantages which derive from the employment of salt mixtures of ammonium chloride and sodium nitrite. Such a salt mixture decomposes white releasing nitrogen when an ammonium chloride molecule reacts with a sodium nitrite molecule. However, since, on the one hand, both these substances, as inorganic substances, are very sparingly soluble in organic substances and, on the other hand, as most of the corresponding substances are used for the foaming process of organic masses, it is necessary to bring the two reaction partners into intimate contact with each other. In a non-processed salt mixture this is impossible since the same would, during storage, gradually decompose completely. According to the known process it is possible to maximally foam this mixture if every one of the expanding agents is dispersed in an extremely finely comminuted state in an inert carrier material. Consequently, the prior condition is the employment of an inert carrier material.

The U.S. Pat. No. 2,250,192 describes a process for the manufacture of rubber products foamed with the aid of gas which consists in that two different vulcanizing agents are mixed into a vulcanizable rubber mixture, in which case each of the vulcanizing agents is capable of vulcanizing the rubber within another temperature range or at another speed, and wherein one of said vulcanizing agents is a sulphur-free vulcanizing agent selected from the class of polynitrobenzoles, peroxides of organic acids, halogenated chinones, chinonoximes and chinonimines and, at low temperatures, possesses an activity higher than that of sulphur, white the other vulcanizing agent is sulphur. In this known process, for the expansion of the rubber, gas possessing a low diffusivity in rubber, such as e.g. nitrogen gas, is employed.

A polyurethane hard foam having a density of approximately 20 g/l through approximately 60 g/l and a proportion of approximately 10% to approximately 80% of the total pore volume in the form of pores having a diameter of at least approximately 1 mm, as well as a proportion of at least 75% of the remaining pore volume in the form of pores having a diameter of less than 250 $\mu m$ is described by the CA-A-767,719. Such a polyurethane hard foam is obtained by the intermixing of a catalyst, a polyole, of polyisocyanate, an expanding agent for the formation of macropores and a micropore-forming agent, in which case the formation of micropores is initiated first, white thereupon follows the activation of the expanding agent for the formation of the macropores so that then, ultimately, subsequent to the final curing, a polyurethane foam possessing micropores and a controlled quantity of macropores is obtained. As expanding agents, use is made of such which are activated at a temperature below the carbonization temperature of polyurethane foam, thus, inter alia, oxalyl azide, ammonium carbonate, hydrazine nitrite, ammonium nitrite, phthaloyl azide and benzoyl azide.

Accordingly, the use of ammonium nitrite as expanding agent for the manufacture of foamed plastics is known. If $CO_2$ is generated, the disadvantages result which have been described in the beginning. However, in none of the known processes, a cooled solution containing ammonium salts and alkali nitrite is employed in order to achieve that, in the p re l i mi nary phase of the actual foaming process, only a very slight reaction involving the formation of $N_2$ is produced prior to the foamed plastic mixture being discharged into a mold.

Object, Solution, Advantages

That is why it is the object of the invention to produce fluorohydrocarbon-free foamed plastics which possess great foam strength at a low volumetric weight of the foam, in which the $CO_2$ content is intended to be kept low during the foaming process and a collapse of the foam is prevented during the final curing phase and, prior to the actual foaming process, in a mold, only a very weak reaction involving the formation of $N_2$ is produced.

This technical problem is resolved in a process for the manufacture of polyurethane foamed plastics of the type described in the beginning by the process steps stated in the claim 1.

The process consequently consists in the manufacture of fluorohydrocarbon-free foamed plastics with pure nitrogen being made use of as expanding agent, which is generated by means of a simultaneous, binary ionic reaction, in which case e.g. solutions of ammonium chloride and sodium nitrite are employed as ion-forming solution. Hereby a part of the expanding effect is achieved with the aid of pure nitrogen. The same is formed in a binary reaction during the manufacturing process according to the following ionic equation $$NH_4^+ + NO_2^- = N_2 + 2H_2O.$$

Equivalent weight: 53.49 g; 68.99 g. Equivalent quantities are employed in saturated solutions and, at a temperature of below 20° C., are added to one of the reaction components of the foam reaction mixture, in which case the one reaction component A forms the polyoles with the processing aids, such as emulsifiers, activators and suchlike, whereas the second reaction component B comprises the diisocyanates. The solution comprising ammonium chloride and sodium nitrite is added exclusively to the reaction component A.

It is also possible to employ the solutions of other salts in lieu of ammonium chloride and sodium nitrite solutions, however, only such salts are to be employed which, in an aqueous or some other suitable medium, react relative to each other in a disassociative fashion white forming $NH_4^+$ amd $NO_2^-$ ions and form nitrogen. On this occasion, the ions are formed in an aqueous solution of ammonium salts (e.g. $NH_4Cl$ $(NH_4)_2SO_4$) and alkali nitrites (e.g. $NANO_2$, $KNO_2$). Equivalent quantities are used in saturated solutions. It is advantageous if a slight surplus of the ammonium salt is used in order to safely convert the existing nitrite.

The substitution of a part of the $CO_2$ with $N_2$ achieved by the process according to the invention prevents the above-listed disadvantages: The diffusion coefficient of the $N_2$ in the PUR foam is approximately 30 times smaller than that of the $CO_2$. On ac count of this the pressure within the cells remains strong enough for preventing a collapse of the foam during the final curing phase. The stabilizing effect of the $N_2$ is additionally intensified in that, for the rapidly diffusing $CO_2$, the concentration gradient is now smaller and the diffusion speed is reduced thereby. As a consequence of the lower stress on the foam structure due to this with the same deformation resistance it is possible to keep the volumetric weight low, which is wherein the main advantage of the process according to the invention resides.

A further advantage consists in that, following the coalescing of the two components, a mixture possessing a creamy consistency is obtained. Thereby the foam becomes especially finepored. Moreover, an exudation or escape of the reaction mixture from leaky points of the mold is prevented. During the stirring of the two reaction components, not a liquid component, but a product having a creamy consistency is obtained which shows the first beginnings of a foam formation.

DESCRIPTION OF THE INVENTION AND BEST MODE FOR CARRYING OUT THE INVENTION

It has surprisingly been shown that, when employing a saturated solution which forms $NH_4^+$ and $NO_2^-$ ions at the equivalent weight ratio which, prior to the intermixing of the reaction components A and 8, is added at low temperatures to the reaction foam component A and, only subsequent to the intermixing and after the foamed plastic mixture is e.g. supplied to the mold or, in a ribbon foaming process, has a l ready been applied, the heat of the incipient exothermic reaction of the foamed plastic component likewise boosts the chemical reaction of the solution white forming $N_2$ and nitrogen is thus released which assumes a function as blowing agent in this case, foamed plastics devoid of any crack formation and core discolorations, possessing a high degree of fine porosity and of low volumetric weight and of a great stability of the cellular structure are obtained. The existing water then combines e.g. by reaction with a part of the cyanate component of the foamed plastic white releasing $CO_2$, which boosts the further foaming. The partial component of the $N_2$ content of nitrogen, subsequent to the foaming process, suffices for ensuring the deformation resistance of the curing foam at a low volumetric weight.

What is essential is that the solution containing the ammonium salts and the alkali nitrite, prior to its employment, is cooled to such an extent that a very weak reaction develops white $N_2$ is being formed prior to the foamed plastic mixture being discharged into the mold. It is only due to the heat of the exothermic reaction of the foamed plastic component that the reaction develops in the mixture white $N_2$ is being formed. By means of this initial cooling it is intended to be achieved that, already at the beginning of the foaming process, no significant quantity of nitrogen is released since the greater volume of nitrogen has to be available for the foaming process. The solutions used may, on their own or after the addition to the reaction component A, be cooled together with the pertinent reaction component.

We claim:

1. Process for the manufacture of polyurethane foamed plastics in which the foaming process is effected with nitrogen which is formed by the reaction of solutions of ammonium salts and alkali nitrites produced by the heat of the incipient exothermic reaction of the foamed plastic reaction components or supplied from the outside, wherein a polyisocyanate and a polyol reaction mixture added to a solution which contains ammonium salt and alkali nitrite, optionally ammonium chloride or ammonium sulfate solution and sodium nitrite or potassium nitrite in order to produce an, initially, weak reaction for a $N_2$ formation by means of a simultaneous, binary reaction of the $NH_4^+$ and $NO_2^-$ ions of the two solutions of ammonium salts and alkali nitrites which form the $NH_4^+$ and $NO_2^-$ ions, prior to the foamed plastic reaction mixture being discharged into a mold, is cooled or brought to a maximum temperature of 25° C., in which case the further $N_2$ formation takes place after the discharge onto the mold due to the heat generated by the reaction.

2. Process according to claim 1, characterized in that the solution which comprises ammonium salts and alkali nitrites is added to the reaction component A of the foamed plastic reaction mixture comprising two reaction components A and B, in which case the reaction component A comprises polyol with processing aids, optionally, emulsifiers and activators, and the reaction component B comprises the diisocyanates.

3. Process according to claim 1, wherein the saturated solutions of ammonium salts and alkali nitrites are employed preferably at an equivalent weight ratio of ammonium salt and alkali nitrite.

* * * * *